No. 666,511. Patented Jan. 22, 1901.
Z. T. FURBISH.
SUPPLEMENTARY CHUCK.
(Application filed Apr. 11, 1900.)
(No Model.)
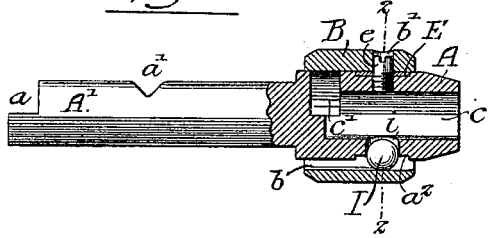
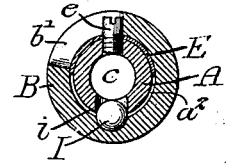
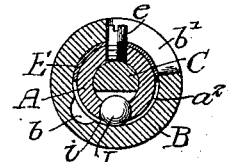
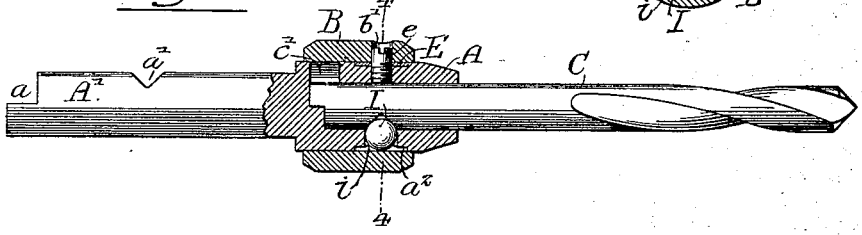
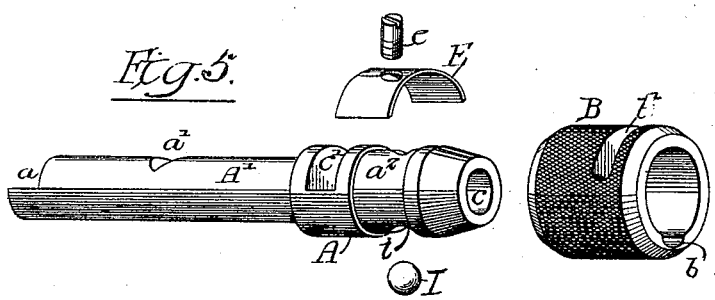
Witnesses:-
Inventor:-
Zachry T. Furbish.
by his Attorneys:-

UNITED STATES PATENT OFFICE.

ZACHRY T. FURBISH, OF PHILADELPHIA, PENNSYLVANIA, ASSIGNOR TO THE NORTH BROTHERS MANUFACTURING COMPANY, OF SAME PLACE.

SUPPLEMENTARY CHUCK.

SPECIFICATION forming part of Letters Patent No. 666,511, dated January 22, 1901.

Application filed April 11, 1900. Serial No. 12,482. (No model.)

*To all whom it may concern:*

Be it known that I, ZACHRY T. FURBISH, a citizen of the United States, residing in Philadelphia, Pennsylvania, have invented certain Improvements in Supplementary Chucks, of which the following is a specification.

The object of my invention is to provide a supplementary chuck which can be used to secure a small drill-bit to a chuck having a socket larger in diameter than the drill-bit. This object I attain in the following manner, reference being had to the accompanying drawings, in which—

Figure 1 is a longitudinal sectional view of my improved supplementary chuck. Fig. 2 is a sectional view on the line 2 2, Fig. 1. Fig. 3 is a view showing the ball in engagement with the drill-stock. Fig. 4 is a section on the line 4 4, Fig. 3; and Fig. 5 is a perspective view showing the parts detached.

A is the body of the chuck, having a shank A', fitting a socket in a chuck of larger size. The end of the shank in the present instance is notched at $a$ to engage the notched portion of the larger chuck, so that the small chuck shall turn with the larger chuck, and the shank is also notched at $a'$, so that a lock on the larger chuck will prevent the withdrawal of the smaller chuck until the lock is released.

The body A of the chuck has an opening $c$ for the drill-bit or other tool C, Fig. 3, and is grooved at $c'$, forming the notch in the chuck, with which the end of the tool engages, as shown in Fig. 3.

A transverse socket $i$ is formed in the chuck, which communicates with the opening $c$, and mounted in the socket $i$ is a ball I. The ball is of such a diameter that it can extend into the longitudinal opening $c$, as shown in Fig. 3. The socket $i$ is tapered, so as to prevent the ball passing entirely out of the socket, the tapered end limiting the movement of the ball.

B is a sleeve mounted on the body of the chuck, and this sleeve has a recess $b$, into which the ball enters when the sleeve is in line with the socket $i$, as shown in Figs. 1 and 2, so that the ball will be clear of the opening $c$ and the shank of a drill can be placed in position or withdrawn from the chuck; but when the sleeve B is turned, as shown in Fig. 4, the ball is forced into the opening $c$, and if the drill-bit is in the position shown in Fig. 3 the ball will enter a notch in the drill-bit and prevent it being removed from the chuck.

The sleeve B is slotted at $b'$, and extending through the slot is a screw-pin $e$, which not only holds the sleeve in position longitudinally on the body of the chuck, but also limits its rotary motion.

I preferably mount on the pin $e$ in a groove $a^2$ in the body of the chuck a spring-plate E, so as to place sufficient friction upon the sleeve that it will remain in the position to which it is moved, so that the sleeve will not shift accidentally.

It will be seen that the chuck can be cheaply manufactured, will take up very little room, and can be readily used as a coupling for securing a drill-bit of small diameter to a chuck having a large socket.

I claim as my invention—

1. The combination in a chuck, of a body portion having a longitudinal opening therein for the drill or other tool, a transverse socket, a ball in the socket, a sleeve mounted on the body of the chuck and grooved to receive the ball, with means for limiting the movement of the sleeve, substantially as described.

2. The combination of the body of a chuck, an opening therein for a drill or other tool, a tapered socket, a ball in said socket, a sleeve mounted on the body of the chuck and grooved to receive the ball, a stop to limit the rotary motion of the sleeve so that it will either allow the ball to enter its groove or be forced into the longitudinal opening for the bit, substantially as described.

3. The combination of the body of a chuck having a longitudinal opening and a socket, a ball in said socket, a sleeve mounted on the body of the chuck and controlling the movement of the ball, and a spring mounted between the sleeve and the body of the chuck so as to retain the sleeve by friction in its adjusted position, substantially as described.

4. The combination of a chuck-body, a longitudinal opening therein for the drill or other tool, a socket, a ball in said socket, a sleeve mounted on the body of the chuck having a groove therein for the reception of a portion of the ball, said sleeve being slotted, a pin projecting from the body of the chuck into the slot, and a spring mounted between the sleeve and the body of the chuck and held in position by the pin, substantially as described.

In testimony whereof I have signed my name to this specification in the presence of two subscribing witnesses.

ZACHRY T. FURBISH.

Witnesses:
WILL. A. BARR,
JOS. H. KLEIN.